(12) United States Patent
Mizutani

(10) Patent No.: US 7,892,308 B2
(45) Date of Patent: Feb. 22, 2011

(54) CERAMIC FILTER

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 1129 days.

(21) Appl. No.: 10/565,110

(22) PCT Filed: Aug. 11, 2004

(86) PCT No.: PCT/JP2004/011552

§ 371 (c)(1),
(2), (4) Date: Oct. 26, 2006

(87) PCT Pub. No.: WO2005/014142

PCT Pub. Date: Feb. 17, 2005

(65) Prior Publication Data

US 2007/0051081 A1    Mar. 8, 2007

(30) Foreign Application Priority Data

Aug. 12, 2003    (JP)    ............... 2003-292274

(51) Int. Cl.
*B01D 39/14*    (2006.01)
*B01D 39/00*    (2006.01)
*B01D 39/06*    (2006.01)
*B01D 50/00*    (2006.01)
*F01N 3/00*    (2006.01)

(52) U.S. Cl. ............... 55/523; 55/522; 55/524; 422/169; 422/170; 422/171; 422/172; 422/177; 422/178; 422/179; 422/180; 422/181; 422/182; 60/297

(58) Field of Classification Search ........... 55/522–524; 60/297; 422/169–182
See application file for complete search history.

(56) References Cited

U.S. PATENT DOCUMENTS

| | | | | |
|---|---|---|---|---|
| 4,417,908 A | * | 11/1983 | Pitcher, Jr. | ............... 55/523 |
| 4,420,316 A | * | 12/1983 | Frost et al. | ............... 55/523 |
| 6,541,407 B2 | * | 4/2003 | Beall et al. | ............... 501/119 |
| 6,669,751 B1 | * | 12/2003 | Ohno et al. | ............... 55/523 |
| 6,673,414 B2 | * | 1/2004 | Ketcham et al. | ............... 428/116 |
| 7,491,373 B2 | * | 2/2009 | Ketcham et al. | ......... 423/213.2 |
| 2002/0078667 A1 | * | 6/2002 | Ishihara et al. | ............. 55/282.3 |
| 2004/0211164 A1 | | 10/2004 | Hamanaka et al. | |
| 2004/0258582 A1 | * | 12/2004 | Miwa et al. | ............... 422/177 |
| 2005/0126140 A1 | | 6/2005 | Ito et al. | |
| 2005/0138908 A1 | * | 6/2005 | Kasai et al. | ............... 55/523 |

FOREIGN PATENT DOCUMENTS

EP    0 821 146 A2    1/1998
EP    1 486 243 A1    12/2004

(Continued)

*Primary Examiner*—Walter D Griffin
*Assistant Examiner*—Amber Orlando
(74) *Attorney, Agent, or Firm*—Oliff & Berridge, PLC

(57) ABSTRACT

A filling percentage of a central portion is larger than that of a peripheral portion at the inlet end surface of an exhaust gas of a honeycomb segment (2) constituting a ceramic filter due to additional filling (13). Thus, an amount of soot accumulated in vents (5) in the central portion of each honeycomb segment (2) is less relative to that in the peripheral portion. This decreases a quantity of heat generated by burning of soot in the central portion, and reduces temperature rise during recycling, thus limiting the maximum temperature of the ceramic filter (1).

1 Claim, 5 Drawing Sheets

FOREIGN PATENT DOCUMENTS

| | | |
|---|---|---|
| JP | A 56-129020 | 10/1981 |
| JP | A 59-54682 | 3/1984 |
| JP | A 2003-126629 | 5/2003 |
| JP | A-2003-161136 | 6/2003 |
| JP | A 2004-154647 | 6/2004 |
| JP | A 2004-162537 | 6/2004 |
| WO | WO0123069 * | 4/2001 |
| WO | WO 03/078027 A1 | 9/2003 |

* cited by examiner

CERAMIC FILTER

TECHNICAL FIELD

The present invention relates to a ceramic filter used as a diesel particulate filter (DPF) or other collection filter. This filter captures and removes particulates such as soot which are contained in exhaust gas from a diesel engine or the like.

BACKGROUND ART

A DPF is disclosed in Japanese Unexamined Patent Application Publication Laid-open No. Sho 56-129020. Porous honeycomb segments made of ceramic such as silicon carbide are bonded together with bonding layers made of cement to be formed into a honeycomb assembly. This honeycomb assembly is shaped into a predetermined shape such as a circular cross section. Then, the periphery thereof is coated with a coating material layer. This DPF is placed in an exhaust system of a diesel engine to be used for cleaning exhaust gas.

Each of the honeycomb segments is partitioned by porous walls and has a large number of vents extending therethrough in the axial direction. Neighboring vents have one end portions alternately filled. The vents of one type are open at the ends on one side but filled at the ends on the other side. The other vents neighboring to these vents are filled at the ends on the other side but open at ends on the one side.

Exhaust gas flows into the DPF having the above-described structure from the open ends of the vents, passes through the porous walls, and flows out from the other vents. While the exhaust gas is passing through the walls, particulates, notably soot, in the exhaust gas are captured by the walls. Thus, the exhaust gas is cleaned.

In such a DPF, the continuation of exhaust gas cleaning causes soot to be accumulated in the vents. Thus, pressure loss increases with time, and cleaning efficiency decreases. Accordingly, recycling needs to be performed in which the soot is burned and removed. In this recycling, the temperatures of the honeycomb segments are raised by the combustion heat of soot. The temperature distribution during recycling is highest in each central portion of the honeycomb segments on the exhaust gas outlet side (see the publication "SAE Technical Paper Series 870010," February 1983).

It is assumed that the maximum temperature on the outlet side becomes a temperature of the tolerable temperature or more of such a honeycomb segment during the recycling of the honeycomb segment. In this case, a crack may occur in the honeycomb segment or a catalyst held may be deteriorated.

The following is a known method for limiting the maximum temperature during the above-described recycling. Temperature is controlled so that the inlet temperature of the DPF during recycling is a certain value or less, or the oxygen concentration and flow rate of air supplied during recycling are controlled. A recycling period is adjusted so that the amount of soot accumulated in the honeycomb segment does not become a certain value or more.

DISCLOSURE OF THE INVENTION

The adjustment of inlet temperature, the control of an oxygen concentration and an air flow rate, and the adjustment of a recycling period, which have been performed heretofore, need to be controlled based on respective conditions by monitoring and collecting information therefor in detail. Accordingly, a sensor or the like for detecting information is necessary. This structure is complex and has the problems of the difficulty of control and the lack of versatility.

An object of the invention is to provide a ceramic filter in which a maximum temperature during recycling is easily limited without performing such complicated control.

A feature of the invention is to provide the following ceramic filter. The ceramic filter includes honeycomb segments bonded together. The honeycomb segments are partitioned by porous walls. The honeycomb segments have vents for exhaust gas to flow therethrough from an inlet to an outlet in a longitudinal direction. Each of the honeycomb segments includes first vents and second vents alternately placed. The first vents are filled at the inlet and are open at the outlet. The second vents are open at the inlet and are filled at the outlet. Each of the honeycomb segments has at the inlet an end surface having a central portion and a peripheral portion enclosing the central portion. The second vents in the central portion are additionally filled at the inlet. The central portion is larger in vent-filling percentage than the peripheral portion at the inlet.

According to this invention, the amount of exhaust gas flowing into the inlet of each honeycomb segment is smaller in the central portion than in the peripheral portion. Accordingly, the amount of soot accumulated in the vents of each honeycomb segment is relatively smaller in the central portion than in the peripheral portion, and therefore the amount of heat generated by soot burning is small in the central portion. This reduces temperature rise during recycling and further limits the maximum temperature of the ceramic filter.

Accordingly, this ceramic filter reduces the possibility that a crack or catalyst deterioration occurs in recycling. The ceramic filter makes it possible to limit the maximum temperature with a simple structure, and therefore requires neither a peripheral instrument such as a sensor nor complicated control.

The additional filling percentage in the central portion may be set on the condition that the increase percentage of the pressure loss of the entire filter, increasing in an amount of additional filling is a predetermined value or less and that the decrease percentage of the maximum temperature during burning of soot accumulated in the filter is a predetermined value or more.

According to this invention, the additional filling percentage is set in accordance with the correlation between the pressure loss and the maximum temperature. Accordingly, the maximum temperature of each honeycomb segment is limited while the pressure loss due to the additional filling in the central portion is being limited to a certain value or less.

The central portion may have an additional filling percentage set within a range of 0.1 to 10% to a total area of an inlet end surface of each honeycomb segment.

According to this invention, the maximum temperature during soot burning is limited while the pressure loss of the ceramic filter is being maintained at a certain value or less, and the additional filling percentage in the central portion is simply set. The central portion may have an additional filling percentage in a range of 0.1 to 5% of the total area of the end surface on the exhaust gas inlet side, or in a range of 0.1 to 3% thereof.

BEST MODES FOR CARRYING OUT THE INVENTION

Figure 1:
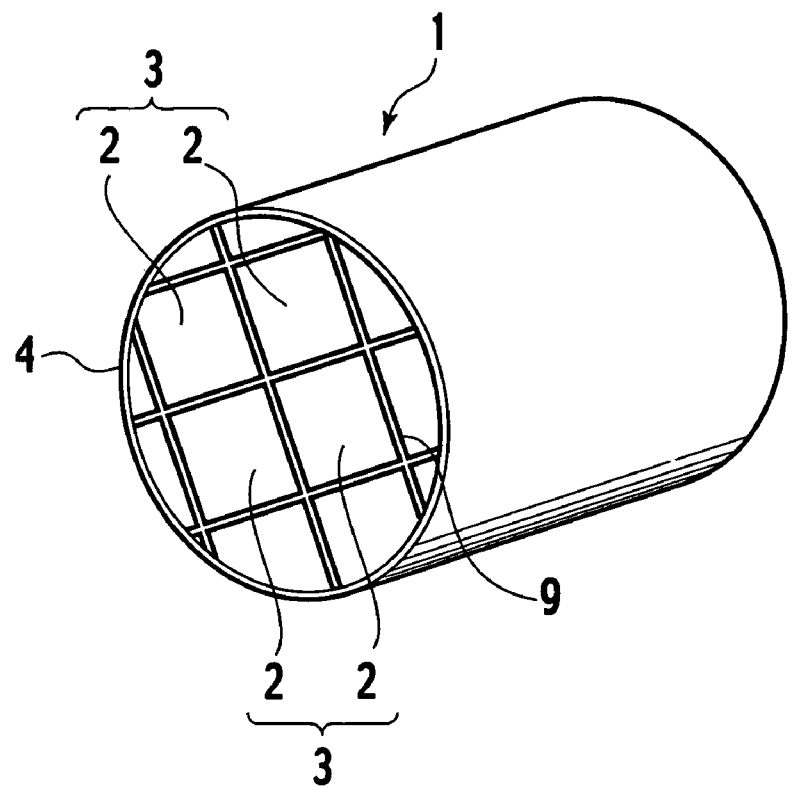
FIG. 1 is a perspective view of a ceramic filter to which one embodiment of the invention is applied.

In FIG. 1, a ceramic filter 1 of an embodiment of the present invention includes a plurality of honeycomb segments 2 assembled together.

The ceramic filter 1 includes a cylindrical honeycomb 3 and a coating agent layer 4 placed around the honeycomb 3. The honeycomb 3 includes the plurality of honeycomb segments 2 bonded together. The honeycomb segments 2 are bonded to each other with bonding layers 9. After the bonding of the honeycomb segments 2, the honeycomb 3 is ground in the peripheral portion thereof to have a circular cross section, an elliptic cross section, a triangular cross section, or other cross section. The periphery of the honeycomb 3 is coated with the coating agent layer 4, thus forming the ceramic filter 1. This ceramic filter 1 as a DPF is placed in a passage of exhaust gas of a diesel engine to capture particulates including soot which are exhausted from the diesel engine.

Figure 2:
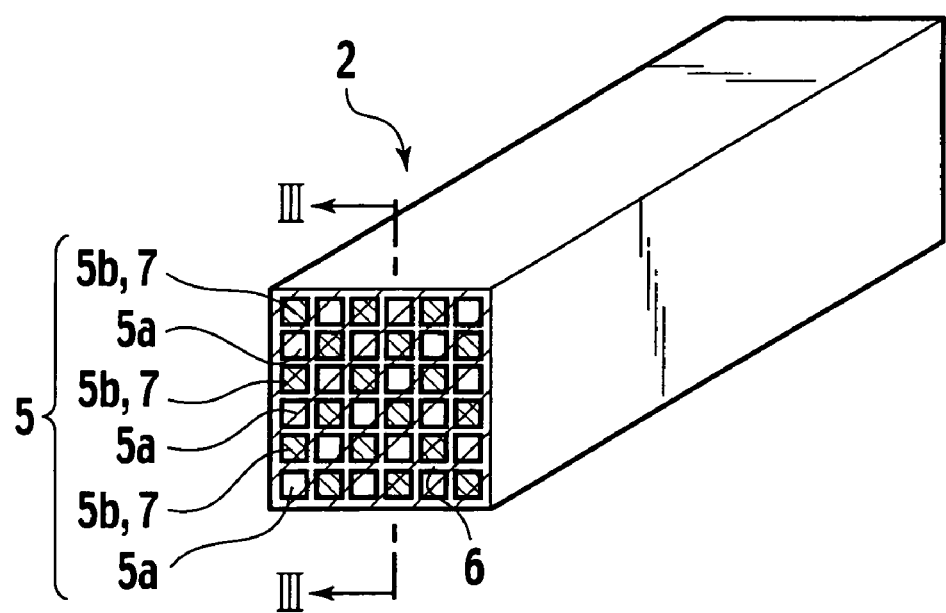
FIG. 2 is a perspective view illustrating one example of a honeycomb segment constituting the ceramic filter of FIG. 1 prior to additional filling.
Figure 3:
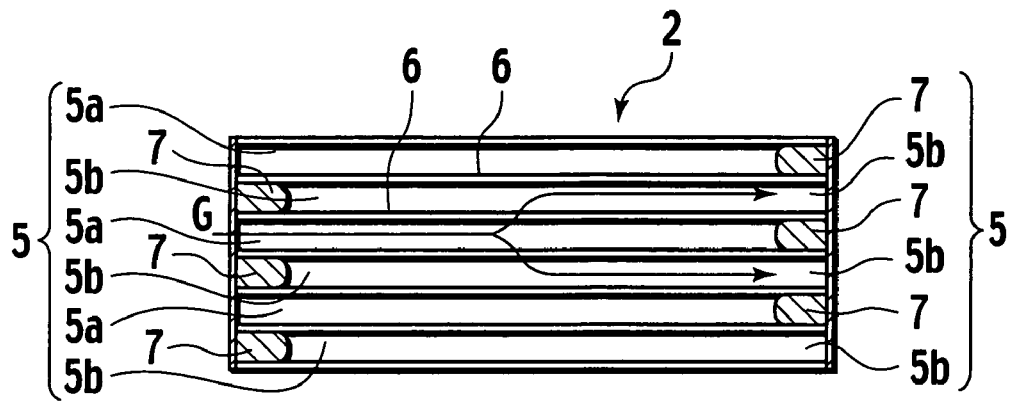
FIG. 3 is a cross-sectional view taken along line III-III of FIG. 2.

In FIGS. 2 and 3, each of the honeycomb segments 2 has a large number of vents 5 partitioned by porous walls 6. The vents 5 extend through the honeycomb segment 2 in the longitudinal direction. One ends of neighboring vents 5a and 5b are alternately filled with filling materials 7. That is, the left ends of the vents 5a of one type are open, whereas the right ends thereof are filled with the filling materials 7. The left ends of the vents 5b neighboring to the vents 5a are filled with the filling materials 7, whereas the right ends thereof are open.

Referring to FIG. 3, the ceramic filter 1 having the assembly of honeycomb segments 2 is placed in a passage of exhaust gas. The exhaust gas G flows into the vents 5 of each honeycomb segment 2 from the left to move toward the right. That is, in FIG. 3, the left end surface of the honeycomb segment 2 is on an exhaust gas inlet side, and the right end surface thereof is on an outlet side. The exhaust gas G flows into the honeycomb segment 2 from the vents 5a (filled on the outlet side) which are not filled but open. This exhaust gas G passes through the porous walls 6 to move to the other vents 5b (open on the outlet side) and flows out from the right end surface. While the exhaust gas G is passing through the walls 6, the walls 6 capture particulates including soot in the exhaust gas G to clean the exhaust gas G. This capture causes soot to be accumulated in the honeycomb segment 2 with time and increases pressure loss. Accordingly, the soot is burned to perform recycling.

The honeycomb segment 2 may have an appropriate cross-sectional shape such as a triangular cross section or a hexagonal cross section other than a square cross section. The vents 5 may be triangular, hexagonal, circular, elliptic, or other in cross-sectional shape.

From the viewpoints of strength and heat resistance, as the material for the honeycomb segment 2, used is a material made of one or more selected from the group consisting of cordierite, mullite, alumina, spinel, silicon carbide, silicon carbide-cordierite composite material, silicon-silicon carbide composite material, silicon nitride, lithium aluminum silicate, aluminum titanate, and Fe—Cr—Al metal.

In the manufacture of the honeycomb segment 2, a binder, a surface-active agent, water, and the like are added to a material selected from the above-described group to prepare a plastic puddle. As the binder, for example, methylcellulose, hydroxypropoxylcellulose, hydroxyethylcellulose, carboxylmethylcellulose, or polyvinylalcohol is used. This puddle is extruded and shaped to become a honeycomb structure having a large number of vents 5 which are partitioned from each other by the walls 6 and which extend through it in the longitudinal direction. This honeycomb structure is dried by microwaves, hot air, or the like and then sintered, thus preparing the honeycomb segment 2.

The bonding layer 9 employs a mixture of inorganic particles or fibers and colloidal as a material. The inorganic particles are of, for example, cement, silicon carbide, silicon nitride, cordierite, alumina, or mullite. The colloidal sol is, for example, colloidal silica or colloidal alumina. The bonding layer 9 employs a material produced by adding metal such as metal fibers, a pore-forming material, particles of various kinds of ceramics, and the like to the above-described mixture as needed.

Figure 4:
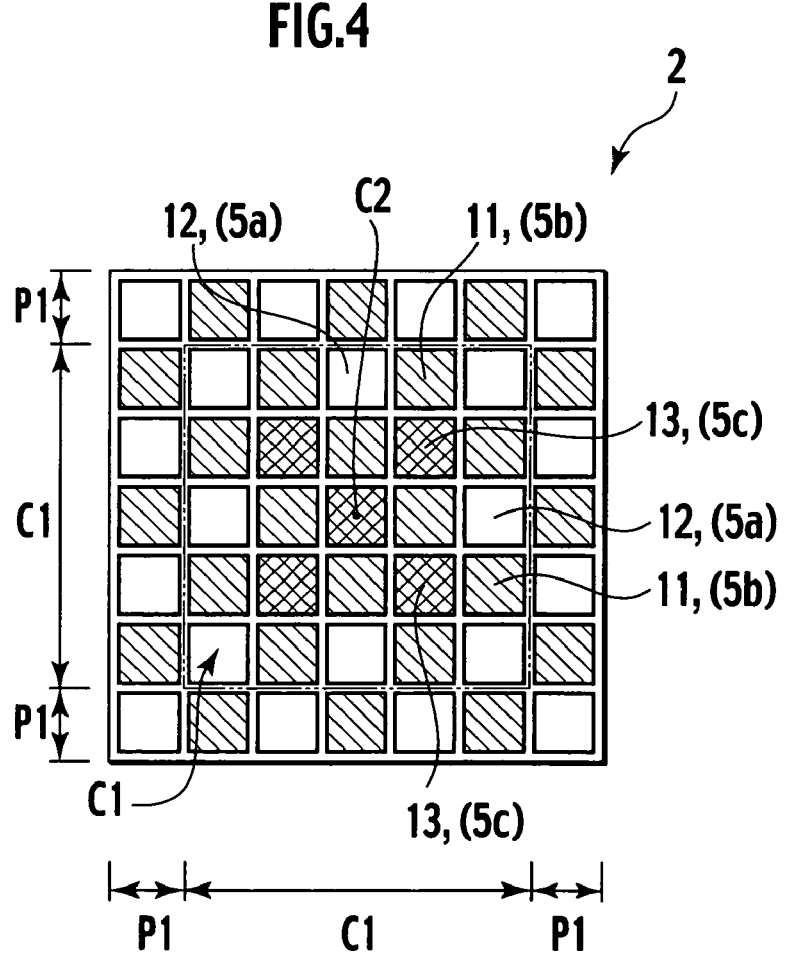
FIG. 4 is a front view illustrating a filling pattern at the end surface of the honeycomb segment on an exhaust gas inlet side after additional filling.

In FIG. 4, the honeycomb segment 2 includes the vents 5b having inlets which are filled with the filling materials 7 and the vents 5a having inlets which are open, at the end surface thereof on the exhaust gas inlet side. The filled and open vents 5a and 5b are alternately placed. The vents 5b have inlets 11 which are filled with filling materials as indicated by hatching. The vents 5a have inlets 12 which are not filled but open.

In this embodiment, the filling percentage of a central portion at the end surface on the exhaust gas inlet side is set larger than that of a peripheral portion. Here, a "filling percentage" is a percentage of the area of filled inlets existing in a predetermined area (central portion or peripheral portion) at the end surface on the exhaust gas inlet side to the predetermined area for each honeycomb segment. The "central portion or internal portion" is an inner region which exists inside the outline of the end surface of the honeycomb segment and which is a similar shape to the outline of the end surface with a scale factor of 70%. The central portion may be arbitrarily set inside the outline of the end surface. The center of similitude is arbitrarily selected under the above-described condition and, for example, may be set to the geometric center of the outline. The "geometric center" is a point which represents the moment of area of the outline. The "peripheral portion or outer portion" is a region between the outline of the end surface and the above-described similar shape.

As described above, the filling percentage in the central portion at the end surface on the exhaust gas inlet side is made larger than that of the peripheral portion. To do so, inlets 13 indicated by crossed-hatching in FIG. 4 are additionally filled with filling materials. Thus, a larger number of filled inlets 11 and 13 are placed in a central portion C1. Here, a peripheral portion P1 is, for example, a region in the outline of the honeycomb segment 2 at the end surface, which region is within a range of 15% of the horizontal and vertical dimensions from each side toward the inside. The central portion C1 is, for example, a region inside the above-described peripheral portion. In other words, the central portion C1 is a region inside a similar shape with the center of similitude at the geometric center C2 and a scale factor of 70%, and the peripheral portion P1 is a region between the outline of the end surface of the similar shape.

Specifically, the central portion C1 has five inlets 13 additionally filled. Thus, nine filled inlets 11 and 13 are placed in the central portion C1 in a concentrated manner. With this placement, the central portion C1 has a filling percentage larger than that of the peripheral portion P1.

The vents 5c having the additionally filled inlets 13 are filled on both of the inlet and outlet sides. Accordingly, exhaust gas does not flow into the vents 5c. Thus, soot is not accumulated in the vents 5c, and heat due to soot burning is not generated. Accordingly, the additional filling has a cooling effect which lowers temperature during soot recycling in the surrounding portions.

Figure 5:
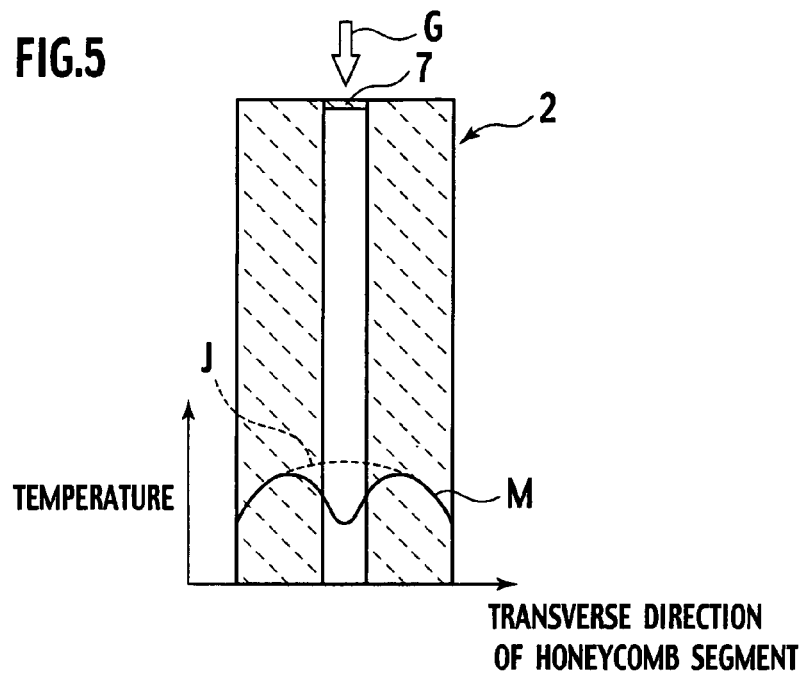
FIG. 5 is a characteristic view illustrating a temperature distribution generated in the honeycomb segment by soot burning.

In FIG. 5, a description will be given of the temperature distribution in the outlet portion of the honeycomb segment 2 for the case where soot is burned for the recycle of the ceramic filter 1.

FIG. 5 illustrates a cross section taken along the axial direction of the honeycomb segment. The exhaust gas G from the diesel engine flows into the honeycomb segment 2 from the direction of the arrow. That is, the arrow G side (upper side in FIG. 5) is the exhaust gas inlet side, and the opposite side (lower side in FIG. 5) is the exhaust gas outlet side.

In the case where a large number of inlets additionally filled are not placed in the central portion, the maximum temperature at the outlet side becomes high as indicated by characteristic curve J. On the other hand, in the case where the additionally filled inlets 13 are placed in the central portion, the maximum temperature at the outlet side does not become high as indicated by characteristic curve M.

For the characteristic curve M, temperature is highest in the periphery of the cross section of the honeycomb segment 2. On the other hand, the honeycomb segment 2 has on the periphery thereof the bonding layers 9 (see FIG. 1) having a large heat capacity and the bonding layers 9 absorb heat, and the maximum temperature does not become high as indicated by characteristic curve J.

That is, in the temperature distribution during recycling which is indicated by characteristic curve J, temperature is higher on the outlet side of each honeycomb segment 2 than on the inlet side thereof. The temperature distribution on the outlet side becomes a distribution which describes an approximate parabola as indicated by characteristic curve J of a dashed line. That is, temperature becomes highest temperature at the center of the cross section of the honeycomb segment and decreases toward the periphery thereof. For a higher temperature on the outlet side than that on the inlet side, in recycling, burning starts from the soot on the inlet side and the soot burning moves toward the outlet side with combustion heat transfer toward the outlet side. For the highest temperature at the center on the outlet side, the honeycomb segment 2 has the bonding layers, such as cement, having a large heat capacity on the periphery thereof and the bonding layers absorb heat.

The maximum temperature of the ceramic filter during recycling is limited as described above, and a crack or catalyst deterioration does not occur in the honeycomb segment 2 during recycling. The filling percentage in the central portion on the exhaust gas inlet side is made larger than that in the peripheral portion. Specifically, a larger number of filled inlets are placed in the central portion. This allows for the maximum temperature limit for the ceramic filter during recycling. Accordingly, the necessity for a peripheral instrument such as a sensor is eliminated to achieve a simple structure, and the necessity for complicated control is eliminated.

The filling percentage in the central portion at the end surface on the exhaust gas inlet side for each honeycomb segment described above is set on the premise that the increase percentage of the pressure loss of the entire filter which increases with an increase in the amount of filling is a predetermined value or less and that the decrease percentage of the maximum temperature during burning of soot accumulated in the filter is a predetermined value or more.

Figure 6:
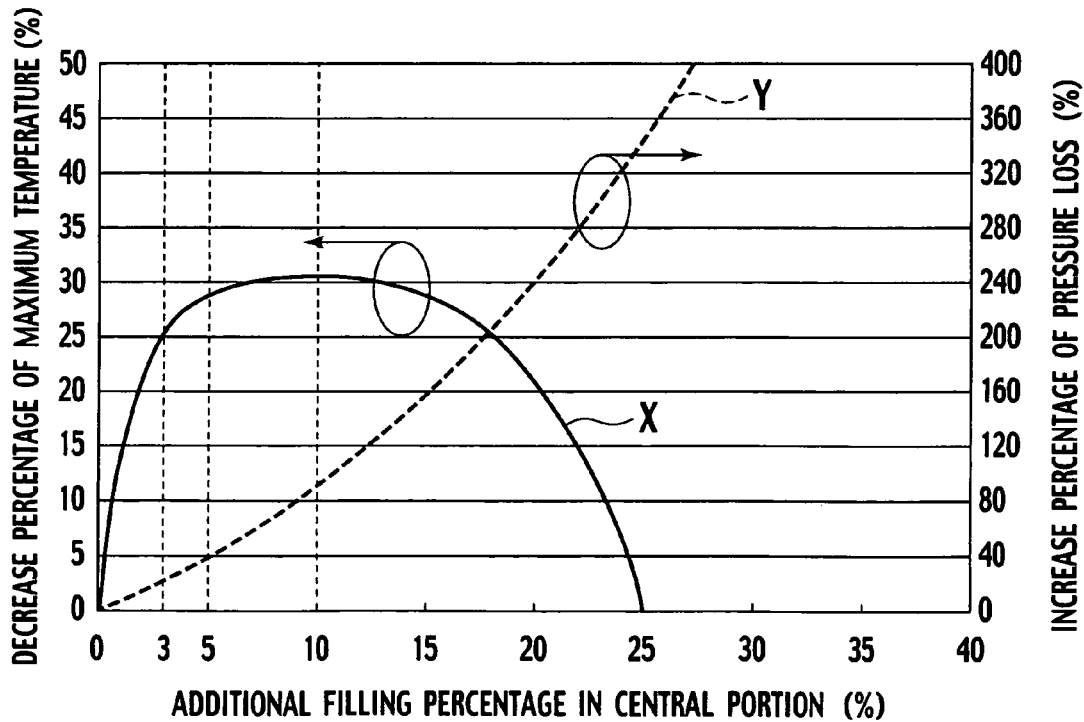
FIG. 6 is a graph illustrating changes in the decrease percentage of maximum temperature and pressure loss with respect to an additional filling percentage in a central portion.

Referring to FIG. 6, a graph will be described in which the additional filling percentage in the central portion, the increase percentage of the pressure loss of the entire filter, and the decrease percentage of the maximum temperature during soot burning in recycling are plotted. The wording "additional filling percentage in the central portion" is a percentage of the total area of vents additionally filled in the central portion on the end surface at the inlet of the honeycomb segment to the total area (central and peripheral portions) of the end surface. Characteristic curve X indicates the decrease percentage of the maximum temperature during soot burning with respect to the additional filling percentage in the central portion of each honeycomb segment 2 constituting the filter 1. Characteristic curve Y indicates the pressure loss of the entire filter 1 with respect to the additional filling percentage in the central portion of each honeycomb segment 2 constituting the filter 1.

Characteristic curve Y is a curve similar to a parabola, and the pressure loss increases with an increase in the filling percentage in the central portion of the honeycomb segment 2. Meanwhile, as indicated by characteristic curve X, the maximum temperature during soot burning decreases with an increase in the additional filling percentage in the central portion of the honeycomb segment 2. On the other hand, when the filling percentage exceeds a certain value, the amount of accumulated soot per unit volume in the peripheral portion enclosing the central portion increases. Thus, the temperature of the peripheral portion increases during recycling. As a result, the maximum temperature of the central portion increases (the decrease percentage of the maximum temperature decreases).

In this embodiment, in consideration of the above-described relations, the additional filling percentage in the central portion of each honeycomb segment constituting the filter is set so that the increase percentage of the pressure loss is a predetermined value or less and that the decrease percentage of the maximum temperature is a predetermined value or more. This makes it possible to limit the maximum temperature while the pressure loss due to the additional filling in the central portion is being limited to a certain value or less.

In the case where consideration is given to such relations, the additional filling percentage in the central portion is set within a range of 0.1 to 10% of the total area of the end surface on the exhaust gas inlet side for each honeycomb segment. More practically, this additional filling percentage in the central portion is preferably in a range of 0.1 to 5% of the total area of the end surface on the inlet side, and most preferably in a range of 0.1 to 3%.

EXAMPLE

Honeycomb segments were prepared, each of which has a square cross section with a side length of 35 mm. The plurality of honeycomb segments are bonded together, thus preparing cylindrical ceramic filters (DPF) illustrated in FIG. 1. The length and number of honeycomb segments integrated therein and the outer diameter of the ceramic filter (DPF) are shown in Table 1.

The wording "cell structure" in Table 1 means the inlet size of vents formed in the honeycomb segment used. The ratio "10/300" indicates (wall thickness)/(cell density). The wall thickness of "10" indicates 10 min mil=0.0254 mm). The cell density of "300" indicates 300 cpsi (cell per square inch).

The wording "additional filling number in the central portion" means the number of inlets of vents additionally filled in the central portion of a checkerboard pattern in which filled inlets and non-filled open inlets are alternately placed to be neighboring to each other. The wording "additional filling area in the central portion" means a filling area corresponding to the inlets of the vents additionally filled in the central portion. The wording "additional filling percentage in the central portion" means the percentage of the additional filling area in the central portion to the total area of the end surface of the honeycomb segment on the exhaust gas inlet side.

In this example, for each ceramic filter (DPF) of Table 1, soot was accumulated by an amount of 10 g/L. Then, the temperature of the ceramic filter (DPF) on the exhaust gas inlet side was raised to 650° C. by post injection by an engine. When the difference in pressure in the DPF in the longitudinal direction decreased, the post injection was stopped to achieve an idle state. The decrease percentage of the maximum temperature and the increase percentage of the pressure loss at this time were measured.

FIGS. 7 to 11 are filling patterns on the exhaust gas inlet sides of honeycomb segments 2A, 2B, 2C, 2D, and 2E. Reference numerals correspond to those of FIG. 4. For the filling patterns of FIGS. 7 to 11, corresponding figure numbers are shown in the "others" column in Table 1.

As can be seen from Table 1, for filing addition percentages within a range of 0.1 to 10%, the maximum temperature of the ceramic filter (DPF) is reliably lowered in a state in which the pressure loss does not affect the soot capture percentage.

TABLE 1

Figure 7:
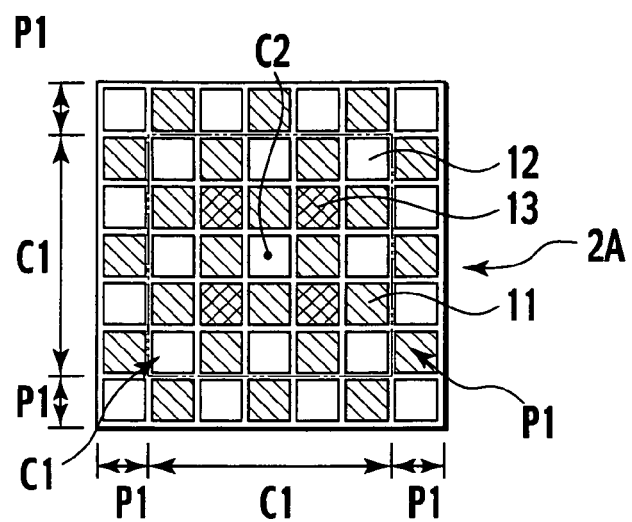
FIG. 7 is a front view illustrating a first filling pattern at the end surface of a honeycomb segment on the exhaust gas inlet side which is used in an example.
Figure 8:
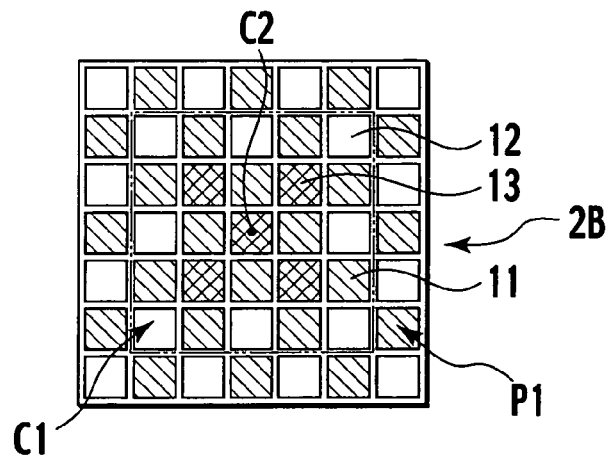
FIG. 8 is a front view illustrating a second filling pattern at the end surface of a honeycomb segment on the exhaust gas inlet side which is used in the example.
Figure 9:
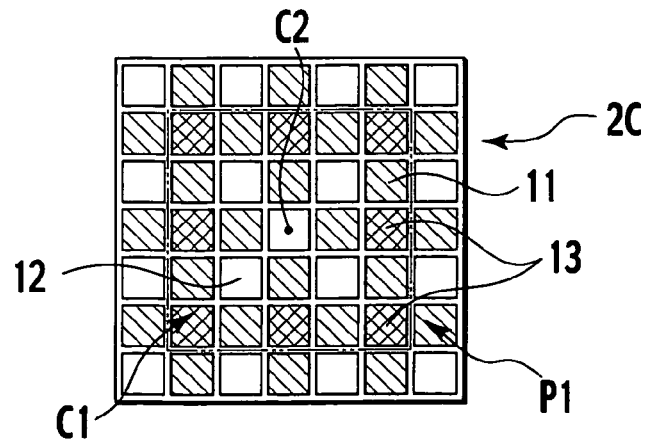
FIG. 9 is a front view illustrating a third filling pattern at the end surface of a honeycomb segment on the exhaust gas inlet side which is used in the example.
Figure 10:
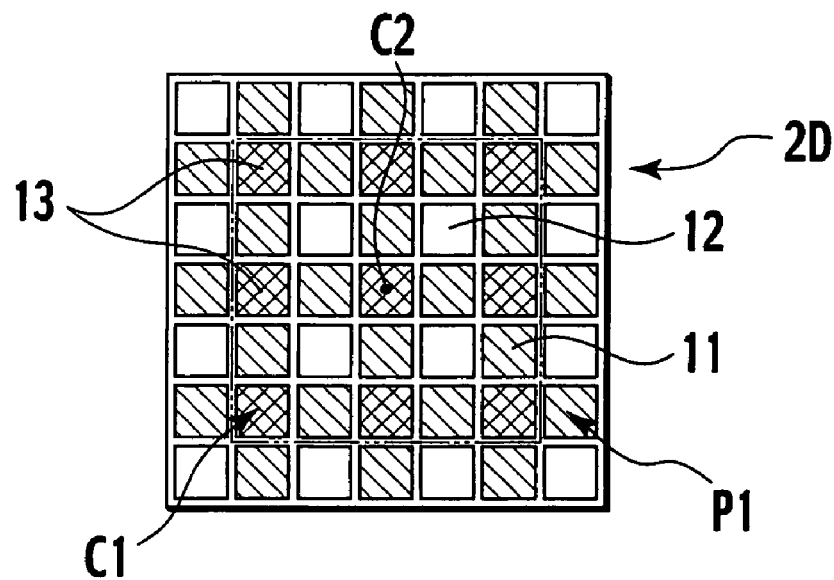
FIG. 10 is a front view illustrating a fourth filling pattern at the end surface of a honeycomb segment on the exhaust gas inlet side which is used in the example.
Figure 11:
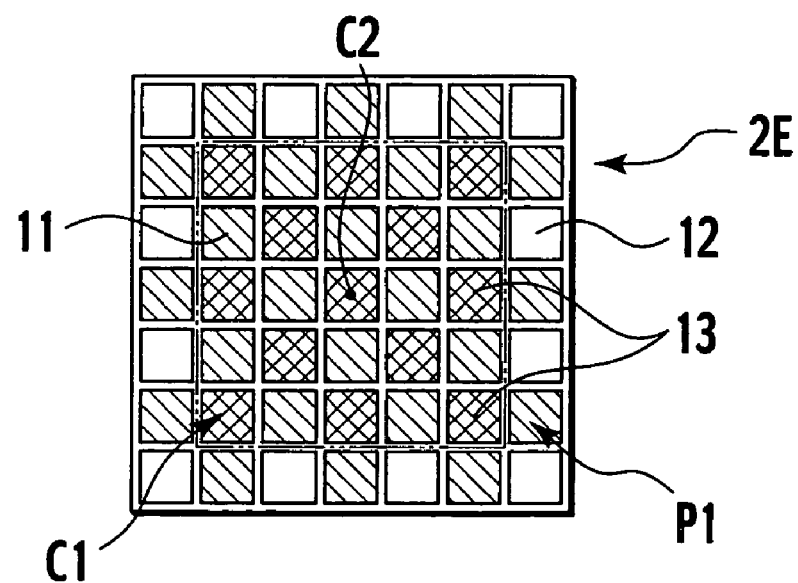
FIG. 11 is a front view illustrating a fifth filling pattern at the end surface of a honeycomb segment on the exhaust gas inlet side which is used in the example.

| DPF size | DPF cross-sectional area [mm$^2$] | Segment size [mm-] | Segment cross-sectional area [mm$^2$] | Segments number | Cell structure | Additional filling number in central portion | Additional filling area in central portion [mm$^2$] | Additional filling percentage in central portion [%] | Decrease percentage of maximum temperature [%] | Increase percentage of pressure loss [%] | Others |
|---|---|---|---|---|---|---|---|---|---|---|---|
| φ5.66" × 6" L | 16241 | 35.9 | 1289.0 | 16 | 10/300 | 5 | 7.4 | 0.6 | 10 | 3% or less | |
| | | 36.5 | 1332.0 | | 15/200 | 5 | 10.0 | 0.7 | 10 | 3% or less | |
| | | 36.5 | 1332.0 | | 17/200 | 5 | 9.3 | 0.7 | 10 | 3% or less | |
| | | 34.2 | 1170.0 | | 16/185 | 5 | 10.7 | 0.9 | 10 | 3% or less | |
| | | 35.9 | 1289.0 | | 12/300 | 1 | 1.3 | 0.1 | 5 | 1% or less | |
| | | 35.9 | 1289.0 | | 12/300 | 4 | 5.4 | 0.4 | 9 | 1% or less | FIG. 7 |
| | | 35.9 | 1289.0 | | 12/300 | 5 | 6.7 | 0.5 | 10 | 3% or less | FIG. 8 |
| | | 35.9 | 1289.0 | | 12/300 | 8 | 10.8 | 0.8 | 12 | 5% | FIG. 9 |
| | | 35.9 | 1289.0 | | 12/300 | 9 | 12.1 | 0.9 | 13 | 7% | FIG. 10 |
| | | 35.9 | 1289.0 | | 12/300 | 13 | 17.6 | 1.4 | 16 | 10% | FIG. 11 |
| | | 35.9 | 1289.0 | | 12/300 | 25 | 33.8 | 2.6 | 23 | 16% | |
| | | 35.9 | 1289.0 | | 12/300 | 100 | 134.9 | 10.5 | 31 | 95% | |
| | | 35.9 | 1289.0 | | 12/300 | 190 | 256.4 | 19.9 | 22 | 238% | |
| | | 35.9 | 1289.0 | | 12/300 | 0 | 0 | 0 | 0 | 0 | |
| | | 57.6 | 3318.0 | 4 | 12/300 | 5 | 7 | 0.2 | 4 | 3% or less | |
| | | 57.6 | 3318.0 | | 12/300 | 25 | 34 | 1.0 | 7 | 8% | |

INDUSTRIAL APPLICABILITY

The ceramic filter of the present invention is used as a filter which captures particulates in exhaust gas, and is favorably applied to a DPF, a boiler, or the like.

The invention claimed is:

1. A ceramic filter comprising:
honeycomb segments bonded together, being partitioned by porous walls, and having vents for exhaust gas to flow therethrough from an inlet to an outlet in a longitudinal direction, wherein
each of the honeycomb segments includes first vents and second vents alternately placed,
the first vents are filled at the inlet and are open at the outlet,
the second vents are open at the inlet and are filled at the outlet,
each of the honeycomb segments has at the inlet an end surface having a central portion and a peripheral portion enclosing the central portion,
the second vents in the central portion are additionally filled at the inlet,
the central portion is larger in vent-filling percentage than the peripheral portion at the inlet,
the central portion has an additional filling percentage set within a range of 0.1 to 3% to a total area of an end surface of each honeycomb segment at the inlet, and
the additional filling percentage is set on the condition that increased percentage of pressure loss of the entire filter, due to increased amount of additional filling, is a predetermined value or less, and that decreased percentage of the maximum temperature during burning of soot accumulated in the filter is a predetermined value or more.

* * * * *